United States Patent
Kim et al.

(10) Patent No.: US 9,435,705 B2
(45) Date of Patent: Sep. 6, 2016

(54) SWITCHING TYPE SIX-AXIS FORCE-TORQUE SENSOR AND SIX-AXIS FORCE-TORQUE MEASURING APPARATUS USING THE SAME

(71) Applicant: Hyundai Motor Company, Seoul (KR)

(72) Inventors: Dong Gu Kim, Gyeonggi-Do (KR); Yong Sung Lee, Gyeonggi-Do (KR); Hiwon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 50 days.

(21) Appl. No.: 14/521,071

(22) Filed: Oct. 22, 2014

(65) Prior Publication Data

US 2015/0185096 A1 Jul. 2, 2015

(30) Foreign Application Priority Data

Dec. 27, 2013 (KR) .................. 10-2013-0165489

(51) Int. Cl.
*G01L 1/22* (2006.01)
*G01L 5/16* (2006.01)
*G01L 1/16* (2006.01)
*G01L 3/10* (2006.01)

(52) U.S. Cl.
CPC ............... *G01L 5/167* (2013.01); *G01L 1/16* (2013.01); *G01L 1/22* (2013.01); *G01L 3/108* (2013.01); *G01L 5/162* (2013.01)

(58) Field of Classification Search
CPC ........... G01L 5/16; G01L 1/22; G01L 3/108; G01L 5/167; G01L 5/162
USPC ..................... 73/862.041–862.046
See application file for complete search history.

(56) References Cited

U.S. PATENT DOCUMENTS

| | | | | |
|---|---|---|---|---|
| 5,872,320 A | * | 2/1999 | Kamentser | G01L 5/223 73/862.044 |
| 6,532,830 B1 | * | 3/2003 | Jansen | G01L 5/161 73/862.042 |
| 6,622,575 B1 | * | 9/2003 | Nagata | A61B 5/225 73/862.042 |
| 2003/0140713 A1 | * | 7/2003 | Ohsato | G01L 5/162 73/862.041 |
| 2006/0213287 A1 | * | 9/2006 | Sakano | G01L 5/161 73/862.042 |
| 2013/0061689 A1 | * | 3/2013 | Mehlmauer | G01L 5/161 73/862.045 |

FOREIGN PATENT DOCUMENTS

KR  10-2006-0118463 A  11/2006

* cited by examiner

*Primary Examiner* — Max Noori
(74) *Attorney, Agent, or Firm* — Mintz Levin Cohn Ferris Glovsky and Popeo, P.C.; Peter F. Corless

(57) ABSTRACT

A switching type six-axis force-torque sensor is provided which includes: a sensor substrate attached to a structural body to be measured. A first measuring unit is installed at one side in respect to a central portion of the sensor substrate and measures strain and a second measuring unit is installed on the sensor substrate at a position that faces the first measuring unit in respect to the central portion and measures strain. Further, a third measuring unit is installed at a position that is orthogonal to a connecting line, which connects the first measuring unit and the second measuring unit, and measures strain and a fourth measuring unit is installed at a position that faces the third measuring unit in respect to the central portion and measures strain.

5 Claims, 16 Drawing Sheets

SWITCHING TYPE SIX-AXIS FORCE-TORQUE SENSOR AND SIX-AXIS FORCE-TORQUE MEASURING APPARATUS USING THE SAME

CROSS-REFERENCE TO RELATED APPLICATION

This application claims priority to and the benefit of Korean Patent Application No. 10-2013-0165489 filed in the Korean Intellectual Property Office on Dec. 27, 2013, the entire contents of which are incorporated herein by reference.

BACKGROUND (a) Field of the Invention

The present invention relates to a switching type six-axis force-torque sensor capable of being miniaturized and having improved sensing performance, and a six-axis force-torque measuring apparatus using the same.

(b) Description of the Related Art

In general, a six-axis force-torque sensor includes a plurality of strain gauges attached to a structural body and is configured to generate mechanical deformation, and measure applied force and torque. In this manner, the strain gauges need to be attached in consideration of a direction in which force is applied, and a position at which maximum deformation occurs. However, the aforementioned manner may cause an error, and this error may result in a measurement error within a range of 2% to 5%. Therefore, a device for calibration is required to be installed to prevent the measurement error, but there are difficulties in facility investment due to high costs of the equipment.

Recently, a method, which manufactures a piezoresistive pattern on a silicon surface through a semiconductor process, attaches the piezoresistive pattern to a structural body which generates deformation, and measures force and torque, has been researched. However, this method measures strain that occurs at one surface of the structural body, but requires the use of a Wheatstone bridge circuit to distinguish six-axis force-torque. However, in the usage of the Wheatstone bridge circuit, wiring between resistors becomes complex, and the number of resistive patterns increases.

The above information disclosed in this Background section is merely for enhancement of understanding of the background of the invention and therefore it may contain information that does not form the prior art that is already known in this country to a person of ordinary skill in the art.

SUMMARY

The present invention provides a switching type six-axis force-torque sensor configured to measure deformation of a structural body by confirming six-axis force-torque without using a Wheatstone bridge circuit, and a six-axis force-torque measuring apparatus using the same.

An exemplary embodiment of the present invention provides a switching type six-axis force-torque sensor that may include: a sensor substrate attached to a structural body to be measured; a first measuring unit installed at one side in respect to a central portion of the sensor substrate and is configured to measure strain; a second measuring unit installed on the sensor substrate at a position that faces the first measuring unit in respect to the central portion and is configured to measure strain; a third measuring unit installed at a position orthogonal to a connecting line, which connects the first measuring unit and the second measuring unit, and is configured to measure strain; and a fourth measuring unit installed at a position that faces the third measuring unit in respect to the central portion and is configured to measure strain.

The first measuring unit, the second measuring unit, the third measuring unit, and the fourth measuring unit may be radially disposed in respect to the central portion, and a strain measuring unit including a plurality of piezoresistive pattern portions may be provided. The sensor substrate may be a silicon wafer. The piezoresistive pattern portions may include strain gauges.

The strain measuring unit may include: a first strain gauge installed on the sensor substrate, and connected with a first resistance detecting unit; a second strain gauge connected with the first strain gauge via a first signal line on the sensor substrate, and connected with a second resistance detecting unit; a third strain gauge connected to the first signal line via a branch line on the sensor substrate, and connected with a third resistance detecting unit; and a fourth strain gauge connected with the third strain gauge via a second signal line, and connected with a fourth resistance detecting unit.

In the strain measuring unit, two strain gauges selected from the first strain gauge, the second strain gauge, the third strain gauge, and the fourth strain gauge may be configured to sense a resistance signal using two detecting units selected from the first resistance detecting unit, the second resistance detecting unit, the third resistance detecting unit, and the fourth resistance detecting unit.

According to the exemplary embodiment of the present invention, two strain gauges selected from the sixteen strain gauges may be configured to sense a combined signal using a switching type, thereby maximizing a resistance signal required to measure a predetermined force, and minimizing a resistance signal not required to measure a predetermined force.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
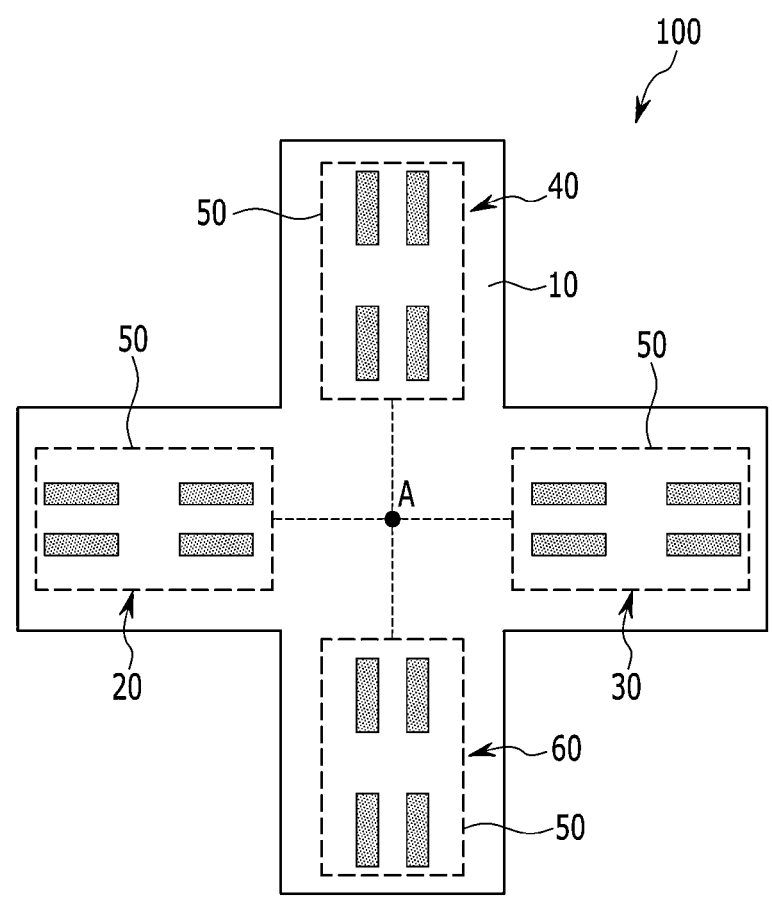
FIG. 1 is an exemplary top plan view schematically illustrating a switching type six-axis force-torque sensor according to an exemplary embodiment of the present invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification.

FIG. 1 is an exemplary top plan view schematically illustrating a switching type six-axis force-torque sensor according to an exemplary embodiment of the present invention. As illustrated in FIG. 1, a switching type six-axis force-torque sensor 100 may include a sensor substrate 10 attached to a structural body to be measured, a first measuring unit 20 may be installed at one side (e.g., a first side) in respect to a substantially central portion A of the sensor substrate 10 and may be configured to measure strain, a second measuring unit 30 may be installed on the sensor substrate 10 at a position that faces the first measuring unit 20 in respect to the substantially central portion A and may be configured to measure strain, a third measuring unit 40 may be installed at a position that is orthogonal to a connecting line, which connects the first measuring unit 20 and the second measuring unit 30, and may be configured to measure strain, and a fourth measuring unit 60 may be installed at a position that faces the third measuring unit 40 in respect to the substantially central portion A and may be configured to measure strain.

The sensor substrate 10 may be installed at a measurement position where force, torque, and the like may be measured, and a silicon wafer may be applied as the sensor substrate 10 in the present exemplary embodiment. The first measuring unit 20, the second measuring unit 30, the third measuring unit 40, and the fourth measuring unit 60 may be radially positioned on the sensor substrate 10 in respect to the substantially central portion A of the sensor substrate 10. Accordingly, the sensor substrate 10 may have an orthogonal shape to radially position the first measuring unit 20, the second measuring unit 30, the third measuring unit 40, and the fourth measuring unit 60. However, the sensor substrate 10 is not necessarily limited to the orthogonal shape, but may have various shapes while corresponding to positions to which the sensor substrate 10 may be attached.

The first measuring unit 20, the second measuring unit 30, the third measuring unit 40, and the fourth measuring unit 60 may be installed to have about the same shape and the same configuration, and strain measuring units 50 having about the same configuration may be installed in the measuring units, respectively. The strain measuring unit 50 refers to a portion where the switching type six-axis force-torque sensor of the present exemplary embodiment may be configured to sense force-torque and the like at a position where the switching type six-axis force-torque sensor is installed. The strain measuring unit 50 will be more specifically described below with reference to FIGS. 2 to 7.

The strain measuring unit 50 may include a first strain gauge 51, a second strain gauge 53, a third strain gauge 55, and a fourth strain gauge 57. The first strain gauge 51 may be connected with a first resistance detecting unit 51a. The first resistance detecting unit 51a may be connected with the first strain gauge 51, and may be configured to sense a variation in value of resistance based on deformation of the first strain gauge 51. The second strain gauge 53 may be disposed at a position in the proximity of the first strain gauge 51, and may be connected with the first strain gauge 51 via a first signal line 52. The second strain gauge 53 may be disposed to have a substantially long length (e.g., a predetermined length) in a direction horizontal similar to the length of the first strain gauge 51. A second resistance detecting unit 53a may be connected to the second strain gauge 53.

The second resistance detecting unit 53a may be connected with the second strain gauge 53, and may be configured to sense a variation in value of resistance based on deformation of the second strain gauge 53. The third strain gauge 55 may be disposed below the first strain gauge 51 and in the proximity of the first strain gauge 51. The third strain gauge 55 may be connected by a branch line 54 connected with the first signal line 52. In addition, a third resistance detecting unit 55a may be connected with the third strain gauge 55, and may be configured to sense a variation in value of resistance.

The fourth strain gauge 57 may be disposed below the third strain gauge 55 and in the proximity of the third strain gauge 55. The fourth strain gauge 57 may be connected by a second signal line 54 connected with the branch line 54. A fourth resistance detecting unit 57a may be connected to the fourth strain gauge 57 and may be configured to sense a variation in value of resistance.

As described above, four strain gauges may be disposed in each of the first measuring unit 20, the second measuring unit 30, the third measuring unit 40, and the fourth measuring unit 60. Therefore, the switching type six-axis force-torque sensor 100 of the present exemplary embodiment may be configured to sense a variation in value of force-torque using sixteen strain gauges.

In the strain measuring unit 50, two strain gauges selected from the first strain gauge 51, the second strain gauge 53, the third strain gauge 55, and the fourth strain gauge 57 may be configured to sense a resistance signal using two detecting units selected from the first resistance detecting unit 51a, the second resistance detecting unit 53a, the third resistance detecting unit 55a, and the fourth resistance detecting unit 57a. Hereinafter, the aforementioned configuration will be specifically described with reference to the drawings.

Figure 2:
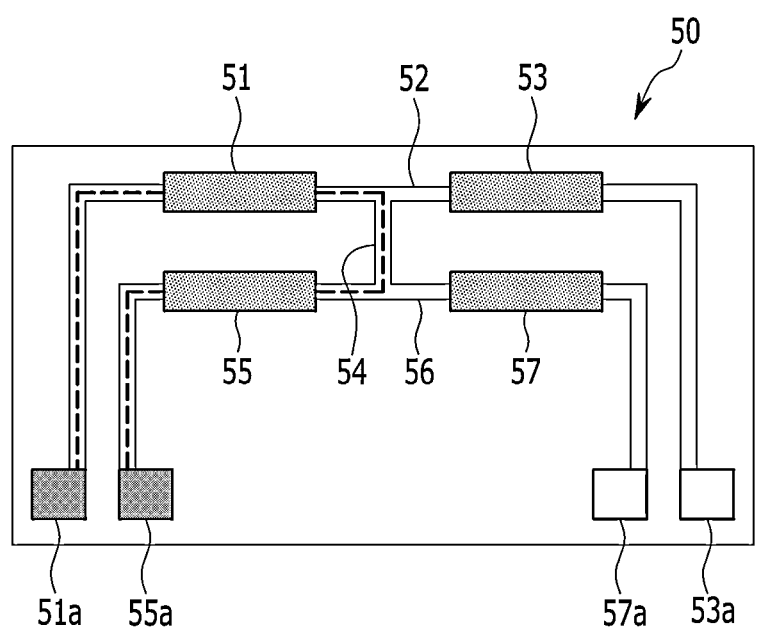
FIG. 2 is an exemplary view schematically illustrating a configuration that detects a resistance signal of a first strain gauge and a third strain gauge using a first resistance detecting unit and a third resistance detecting unit according to an exemplary embodiment of the present invention.

FIG. 2 is an exemplary view schematically illustrating a configuration configured to detect a resistance signal of the first strain gauge and the third strain gauge using the first resistance detecting unit and the third resistance detecting unit. As illustrated in FIG. 2, a variation in value of resistance of the first strain gauge 51 and the third strain gauge 55 may be sensed by sensing a variation in value of resistance by the first resistance detecting unit 51a and the third resistance detecting unit 55a.

Figure 3:
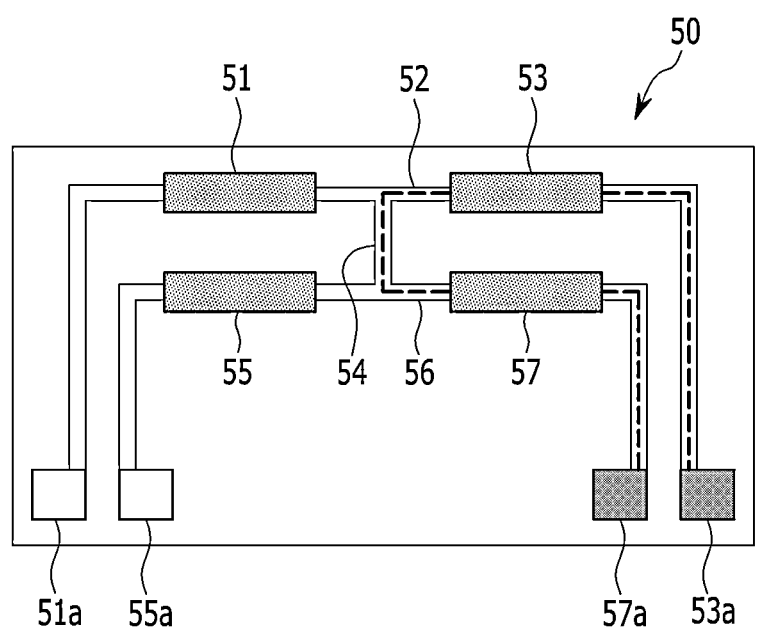
FIG. 3 is an exemplary view schematically illustrating a configuration that detects a resistance signal of a second strain gauge and a fourth strain gauge using a second resistance detecting unit and a fourth resistance detecting unit according to an exemplary embodiment of the present invention.

FIG. 3 is an exemplary view schematically illustrating a configuration configured to detect a resistance signal of the second strain gauge and the fourth strain gauge using the second resistance detecting unit and the fourth resistance detecting unit. As illustrated in FIG. 3, a variation in value of resistance of the second strain gauge 53 and the fourth strain gauge 57 may be sensed by sensing a variation in value of resistance by the second resistance detecting unit 53a and the fourth resistance detecting unit 57a.

Figure 4:
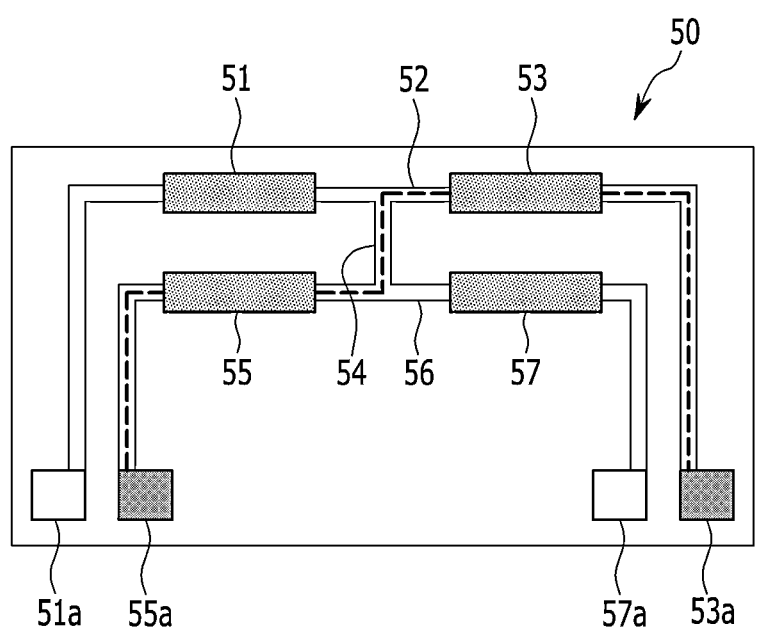
FIG. 4 is an exemplary view schematically illustrating a configuration that detects a resistance signal of the second strain gauge and the third strain gauge using the second resistance detecting unit and the third resistance detecting unit according to an exemplary embodiment of the present invention.

FIG. 4 is an exemplary view schematically illustrating a configuration configured to detect a resistance signal of the second strain gauge and the third strain gauge using the second resistance detecting unit and the third resistance detecting unit. As illustrated in FIG. 4, a variation in value of resistance of the second strain gauge 53 and the third strain gauge 55 may be sensed by sensing a variation in value of resistance by the second resistance detecting unit 53a and the third resistance detecting unit 55a.

Figure 5:
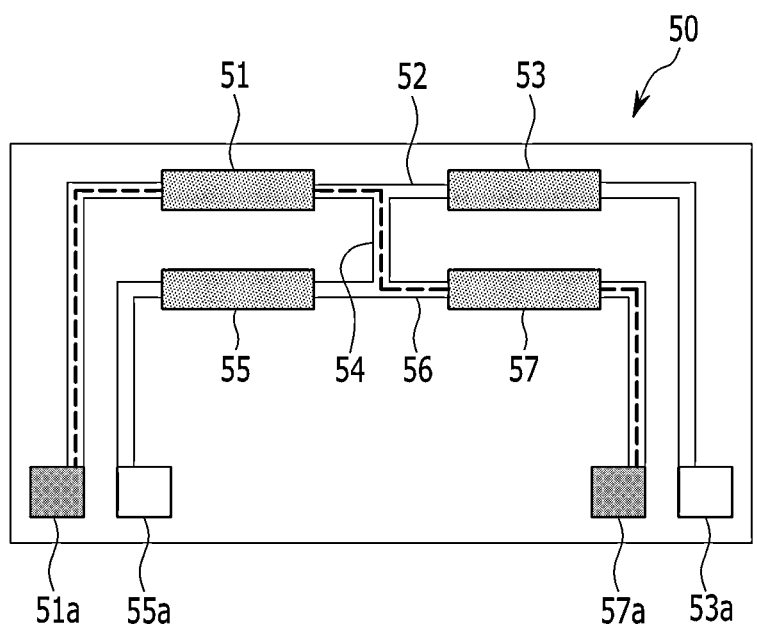
FIG. 5 is an exemplary view schematically illustrating a configuration that detects a resistance signal of the first strain gauge and the fourth strain gauge using the first resistance detecting unit and the fourth resistance detecting unit according to an exemplary embodiment of the present invention.

FIG. 5 is an exemplary view schematically illustrating a configuration configured to detect a resistance signal of the first strain gauge and the fourth strain gauge using the first resistance detecting unit and the fourth resistance detecting unit. As illustrated in FIG. 5, a variation in value of resistance of the first strain gauge 51 and the fourth strain gauge 57 may be sensed by sensing a variation in value of resistance by the first resistance detecting unit 51a and the fourth resistance detecting unit 57a.

Figure 6:
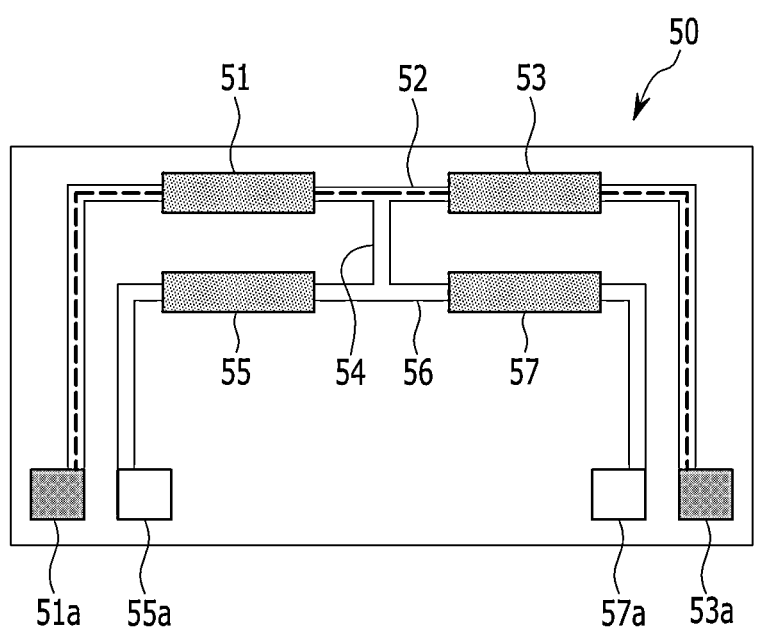
FIG. 6 is an exemplary view schematically illustrating a configuration that detects a resistance signal of the first strain gauge and the second strain gauge using the first resistance detecting unit and the second resistance detecting unit according to an exemplary embodiment of the present invention.

FIG. 6 is an exemplary view schematically illustrating a configuration configured to detect a resistance signal of the first strain gauge and the second measuring unit using the first resistance detecting unit and the second resistance detecting unit. As illustrated in FIG. 6, a variation in value of resistance of the first strain gauge 51 and the second strain gauge 53 may be sensed by sensing a variation in value of resistance by the first resistance detecting unit 51a and the second resistance detecting unit 53a.

Figure 7:
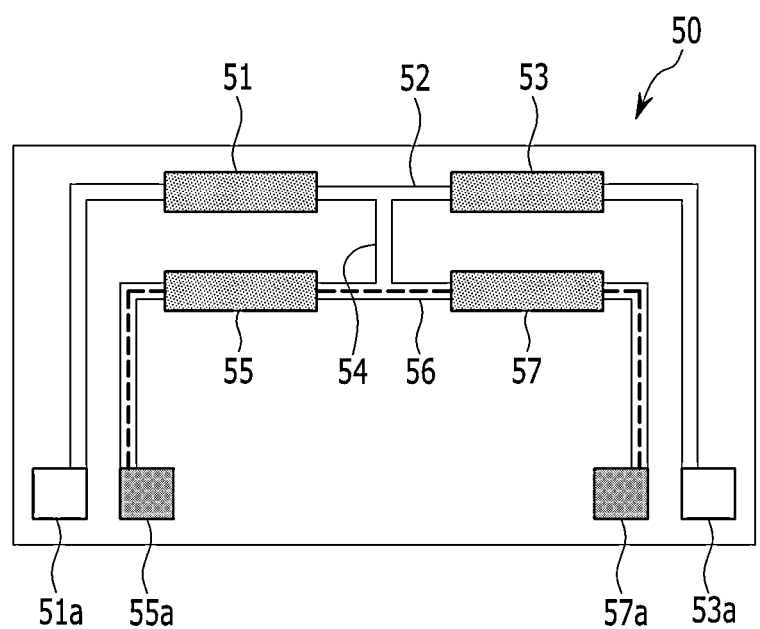
FIG. 7 is an exemplary view schematically illustrating a configuration that detects a resistance signal of the third strain gauge and the fourth strain gauge using the third resistance detecting unit and the fourth resistance detecting unit according to an exemplary embodiment of the present invention.

FIG. 7 is an exemplary view schematically illustrating a configuration configured to detect a resistance signal of the third strain gauge and the fourth strain gauge using the third resistance detecting unit and the fourth resistance detecting unit. As illustrated in FIG. 7, a variation in value of resistance of the third strain gauge 55 and the fourth strain gauge 57 may be sensed by sensing a variation in value of resistance by the third resistance detecting unit 55a and the fourth resistance detecting unit 57a.

As described above, the switching type six-axis force-torque sensor 100 of the present exemplary embodiment may be configured to sense a combined signal in a switching type by two strain gauges selected from the sixteen strain gauges, thereby maximizing a resistance signal used to measure a predetermined force, and minimizing a resistance signal not required (e.g., unnecessary) to measure a predetermined force. In addition, about forty strain gauges are used in the related art, but in the present exemplary embodiment, the sixteen strain gauges may be used, thereby reducing the complexity of the configuration.

As such, in the strain measuring unit 50, which may be installed in each of the first measuring unit 20, the second measuring unit 30, the third measuring unit 40, and the fourth measuring unit 60, six combined signals may be detected, as illustrated in FIGS. 2 to 7. Therefore, the switching type six-axis force-torque sensor of the present exemplary embodiment may be configured to detect twenty-four combined resistance signals in the four measuring units 20, 30, 40, and 60.

Hereinafter, a tensile deformation state and a compressive deformation state, which are applied in Fx, Fy, Fz, Mx, My, and Mz directions when the first measuring unit 20, the second measuring unit 30, the third measuring unit 40, and the fourth measuring unit 60 are installed, will be more specifically described with reference to FIGS. 8 to 15, and Table 1.

Figure 8:
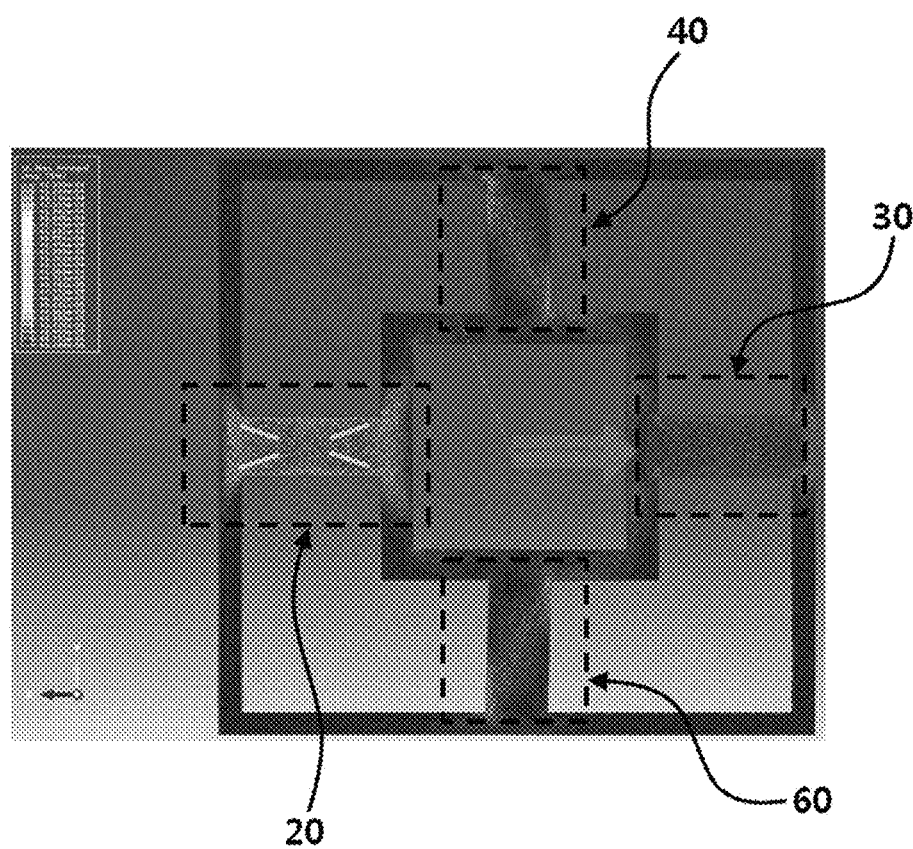
FIG. 8 is an exemplary view schematically illustrating a tensile deformation state due to force in an Fx (Fz) direction according to an exemplary embodiment of the present invention.

FIG. 8 is an exemplary view schematically illustrating a tensile deformation state due to force in the Fx (Fz) direction. As shown in FIG. 8, a larger tensile deformation may occur in the first measuring unit 20 than the other measuring units.

Figure 9:
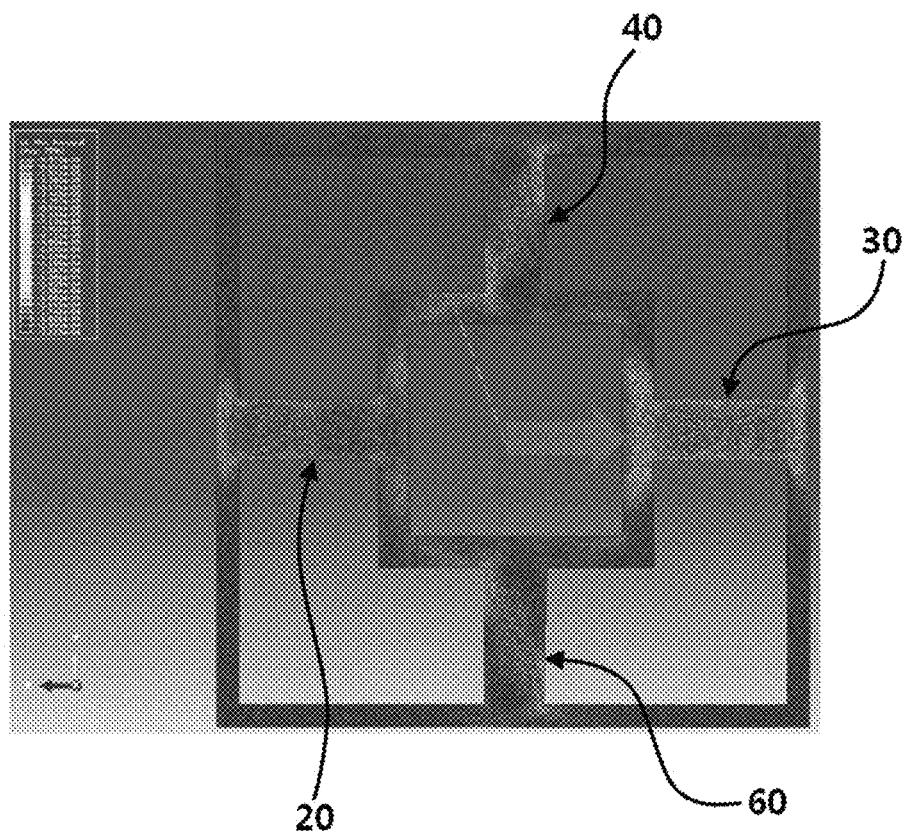
FIG. 9 is an exemplary view schematically illustrating a compressive deformation state due to force in the Fx (Fz) direction according to an exemplary embodiment of the present invention.

FIG. 9 is an exemplary view schematically illustrating a compressive deformation state due to force in the Fx (Fy) direction. As shown in FIG. 9, a larger compressive deformation may occur in the second measuring unit 30 than in the other measuring units.

Figure 10:
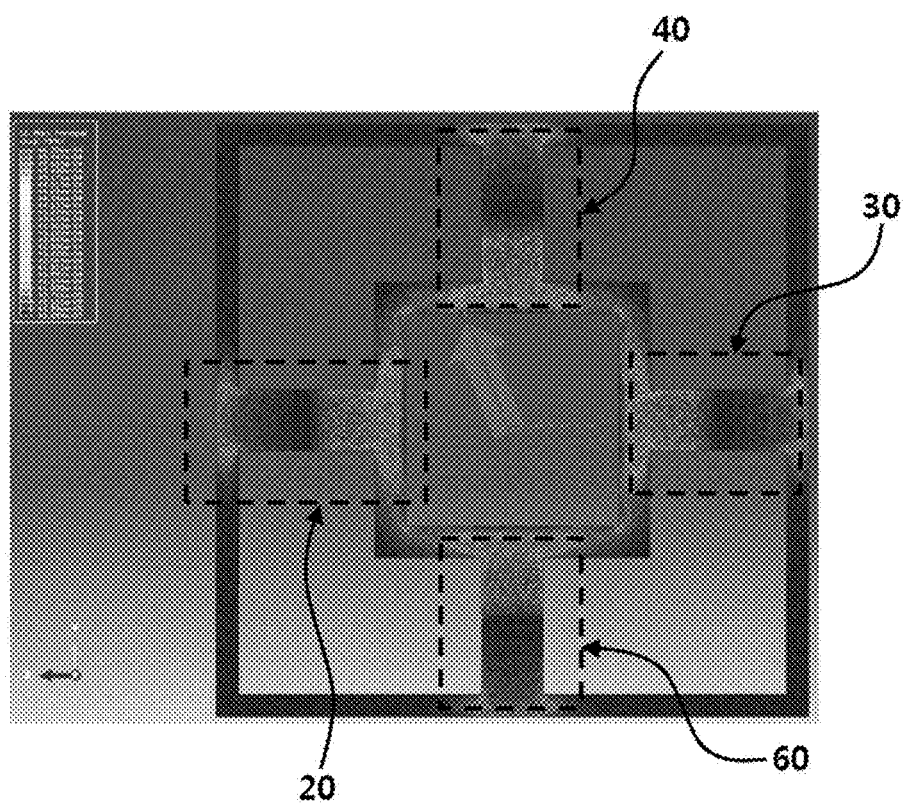
FIG. 10 is an exemplary view schematically illustrating a tensile deformation state due to force in the Fz direction according to an exemplary embodiment of the present invention.

FIG. 10 is an exemplary view schematically illustrating a tensile deformation state due to force in the Fz direction. As shown in FIG. 10, tensile deformation due to force in the Fz direction may occur in all of the first measuring unit 20, the second measuring unit 30, the third measuring unit 40, and the fourth measuring unit 60.

Figure 11:
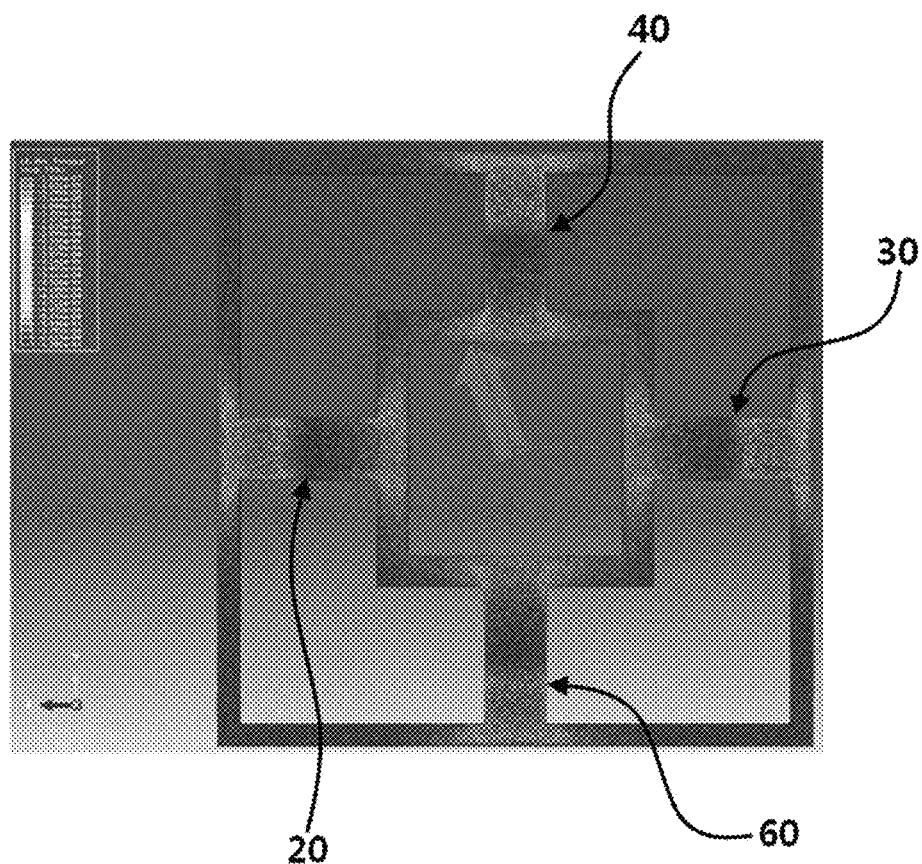
FIG. 11 is an exemplary view schematically illustrating a compressive deformation state due to force in the Fz direction according to an exemplary embodiment of the present invention.

FIG. 11 is an exemplary view schematically illustrating a compressive deformation state due to force in the Fz direction. As shown in FIG. 11, compressive deformation due to force in the Fz direction may occur in all of the first measuring unit 20, the second measuring unit 30, the third measuring unit 40, and the fourth measuring unit 60.

Figure 12:
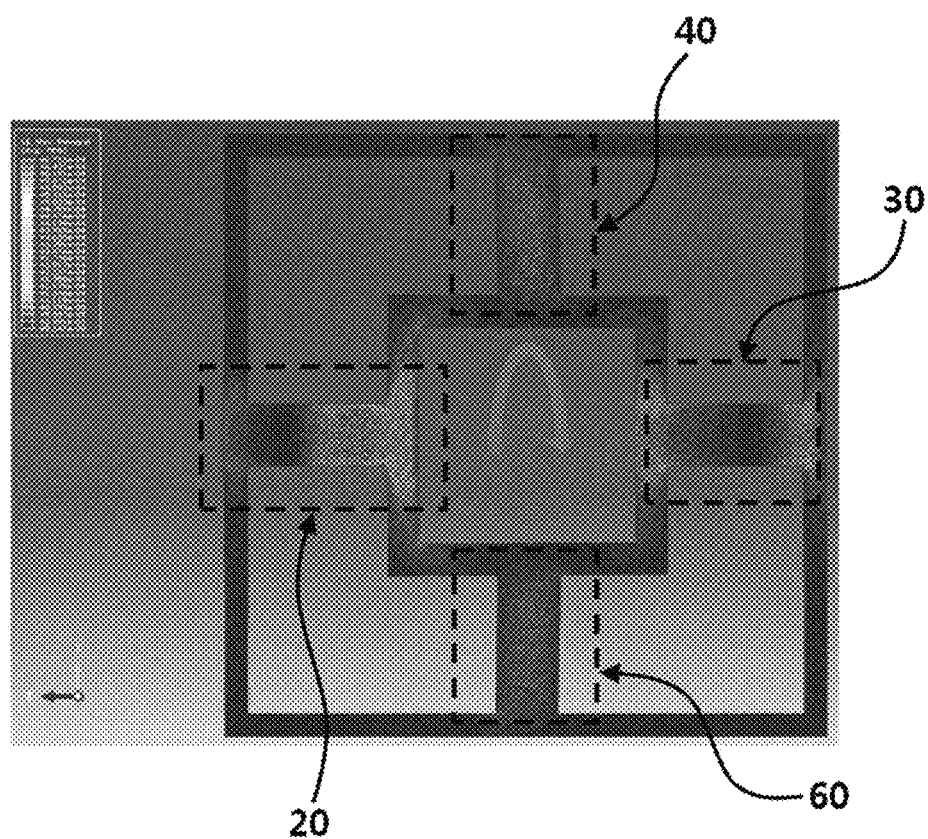
FIG. 12 is an exemplary view schematically illustrating a tensile deformation state due to moment of force applied in an Mx (My) direction according to an exemplary embodiment of the present invention.

FIG. 12 is an exemplary view schematically illustrating a tensile deformation state due to moment of force applied in an Mx (My) direction. As shown in FIG. 12, a larger tensile moment deformation occurs in the first measuring unit 20 than the other measuring units.

Figure 13:
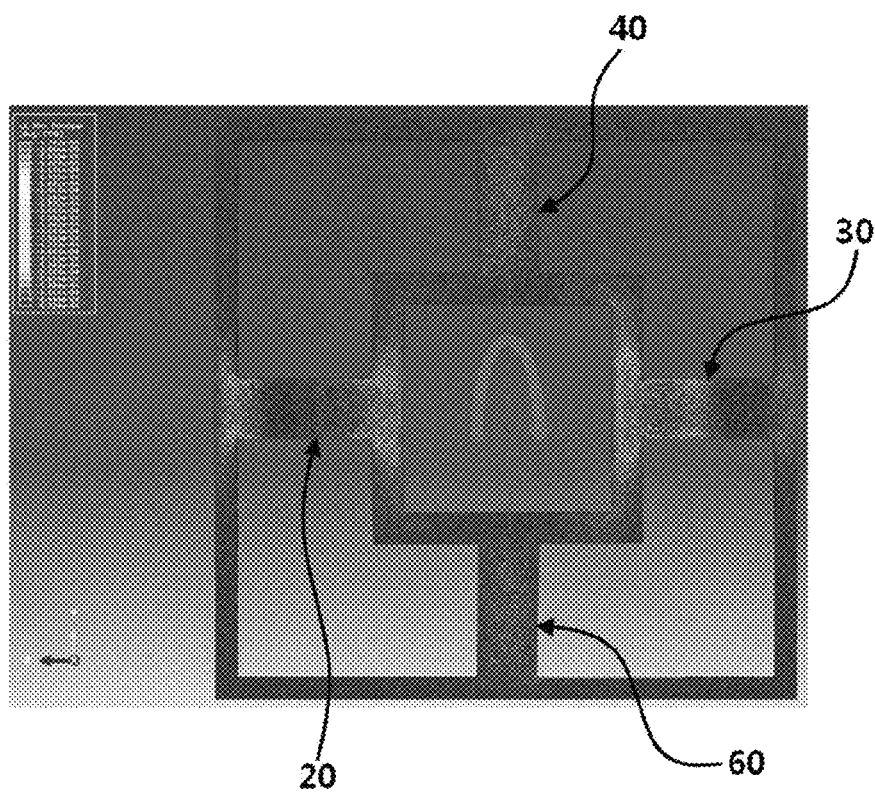
FIG. 13 is an exemplary view schematically illustrating a compressive deformation state due to moment of force applied in the Mx (My) direction according to an exemplary embodiment of the present invention.

FIG. 13 is an exemplary view schematically illustrating a compressive deformation state due to moment of force applied in the Mx (My) direction. As shown in FIG. 13, a larger compressive moment deformation occurs in the second measuring unit 30 than the other measuring units.

Figure 14:
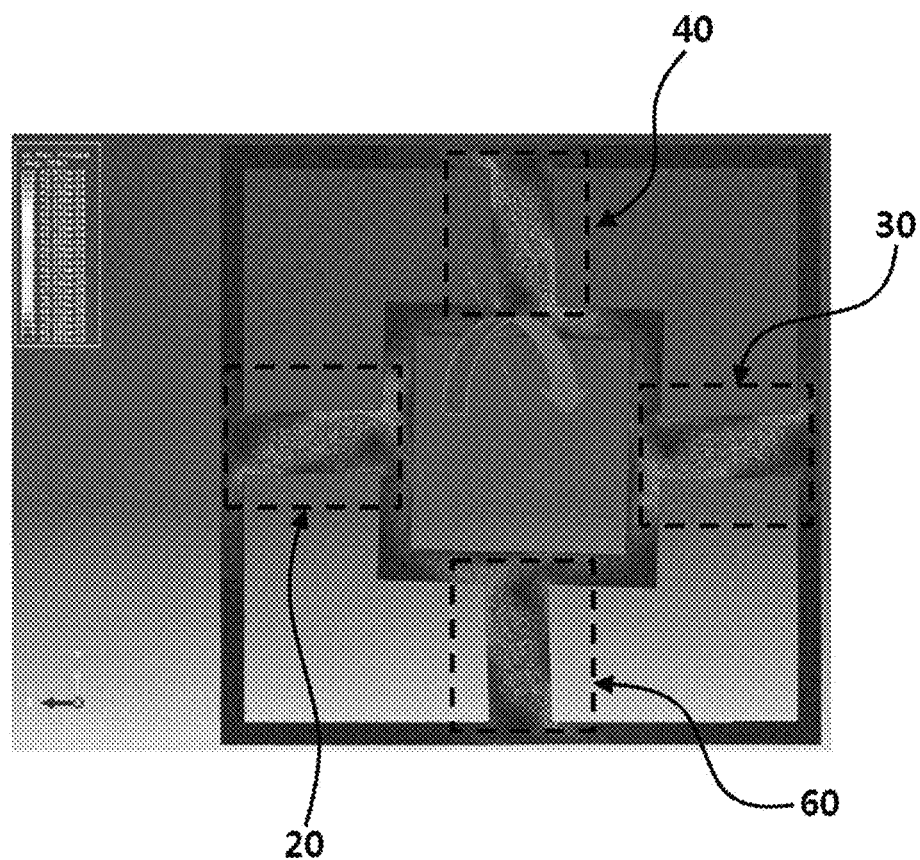
FIG. 14 is an exemplary view schematically illustrating a tensile deformation state due to force in an Mz direction according to an exemplary embodiment of the present invention.

FIG. 14 is an exemplary view schematically illustrating a tensile deformation state due to force in an Mz direction. As shown in FIG. 14, tensile moment deformation may occur in all of the first measuring unit 20, the second measuring unit 30, the third measuring unit 40, and the fourth measuring unit 60.

Figure 15:
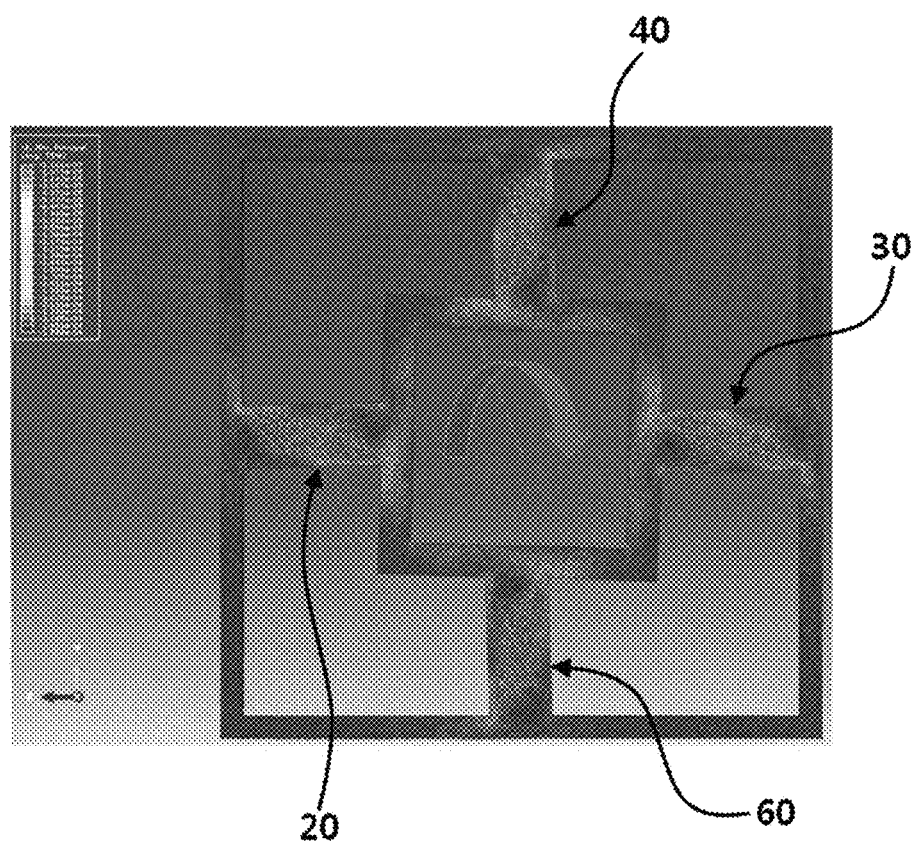
FIG. 15 is an exemplary view schematically illustrating a compressive deformation state due to force in the Mz direction according to an exemplary embodiment of the present invention.

FIG. 15 is an exemplary view schematically illustrating a compressive deformation state due to force in the Mz direction. As shown in FIG. 15, compressive moment deformation may occur in all of the first measuring unit 20, the second measuring unit 30, the third measuring unit 40, and the fourth measuring unit 60.

Meanwhile, as illustrated in FIGS. 9 to 15, the measured signals of the six-axis force in the Fx, Fy, Fz, Mx, My, and Mz directions may be configured to measure force-torque through a switching type six-axis force-torque measuring apparatus 200 that will be described below.

Figure 16:
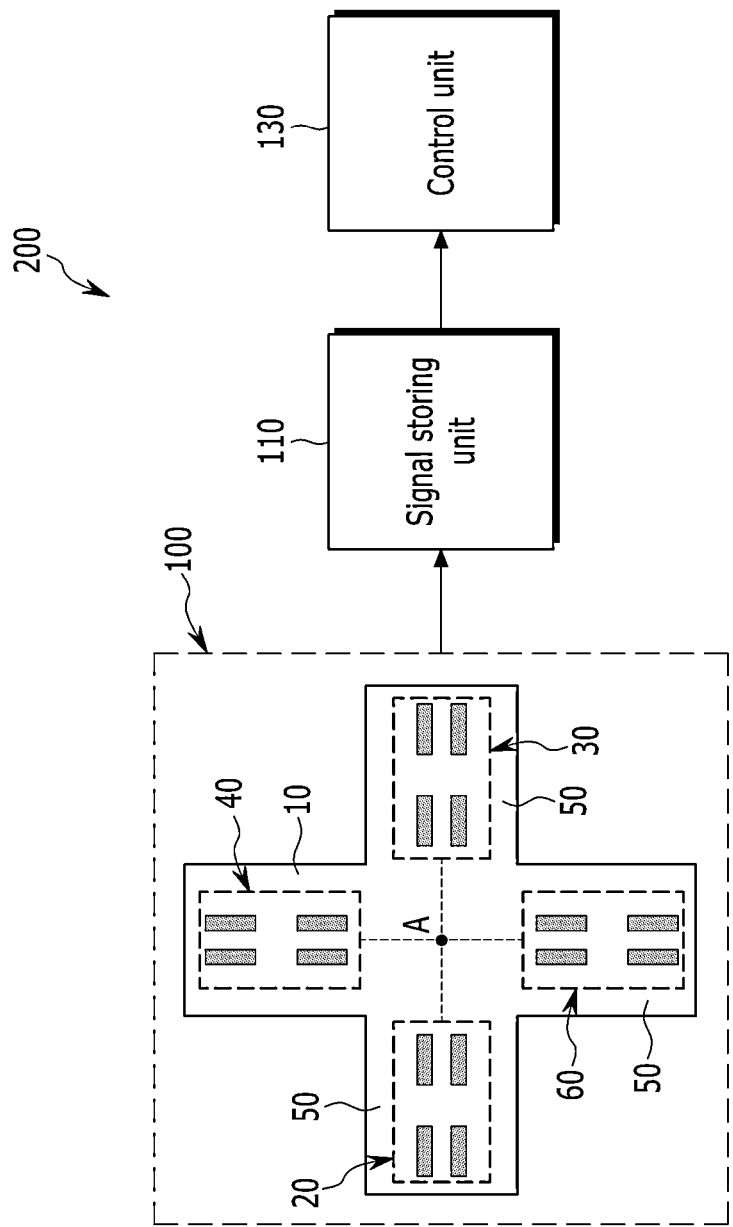
FIG. 16 is an exemplary view schematically illustrating a six-axis force-torque measuring apparatus according to an exemplary embodiment of the present invention.

FIG. 16 is an exemplary view schematically illustrating the switching type six-axis force-torque measuring apparatus 200 according to the exemplary embodiment of the present invention. The same reference numeral in FIGS. 1 to 15 refers to the same member having the same function. Hereinafter, a detailed description of a part having the same reference numeral will be omitted. As illustrated in FIG. 16, the switching type six-axis force-torque measuring apparatus 200 according to the exemplary embodiment of the present invention may include a signal storing unit 110, and a controller 130 configured to combine six-axis force-torque measurement signals stored in the signal storing unit 110.

The signal storing unit 110 may be executed by the controller 130 to store the measured signals of the six-axis force in the Fx, Fy, Fz, Mx, My, and Mz directions, as illustrated in FIGS. 9 to 15. The controller 130 may be configured to receive a control signal transmitted via the signal storing unit 110, and may be configured to detect any one force in the Fx, Fy, Fz, Mx, My, and Mz directions by combining the measured signals. The aforementioned configuration will be more specifically described below.

Table 1 is an exemplary table showing the measured signals of the strain measuring unit 50 measured by the first measuring unit 20, the second measuring unit 30, the third measuring unit 40, and the fourth measuring unit 60 according to the exemplary embodiment of the present invention.

TABLE 1

| | First measuring unit | | | | | | Fourth measuring unit | | | | | | Second measuring unit | | | | | | Third measuring unit | | | | | |
|---|---|---|---|---|---|---|---|---|---|---|---|---|---|---|---|---|---|---|---|---|---|---|---|---|
| | R1 | R2 | R3 | R4 | R5 | R6 | R1 | R2 | R3 | R4 | R5 | R6 | R1 | R2 | R3 | R4 | R5 | R6 | R1 | R2 | R3 | R4 | R5 | R6 |
| Fx | + | + | + | + | + | + | 0 | 0 | 0 | 0 | − | + | − | − | − | − | − | − | 0 | 0 | 0 | 0 | + | − |
| Fy | 0 | 0 | 0 | 0 | + | − | + | + | + | + | + | + | 0 | 0 | 0 | 0 | − | + | − | − | − | − | − | − |
| Fz | − | 0 | + | 0 | 0 | 0 | − | 0 | + | 0 | 0 | 0 | − | 0 | + | 0 | 0 | 0 | − | 0 | + | 0 | 0 | 0 |
| Mx | 0 | 0 | 0 | 0 | − | + | + | 0 | − | 0 | 0 | 0 | 0 | 0 | 0 | 0 | + | − | − | 0 | + | 0 | 0 | 0 |
| My | − | 0 | + | 0 | 0 | 0 | 0 | 0 | 0 | 0 | − | + | + | 0 | − | 0 | 0 | 0 | 0 | 0 | 0 | 0 | + | − |
| Mz | 0 | 0 | 0 | 0 | − | + | 0 | 0 | 0 | 0 | − | + | 0 | 0 | 0 | 0 | − | + | 0 | 0 | 0 | 0 | − | + |

In the aforementioned table, R1 refers to a state of a sensing signal of two resistance detecting units of the strain measuring unit of FIG. 2, R2 refers to a state of a sensing signal of two resistance detecting units of the strain measuring unit of FIG. 3, R3 refers to a state of a sensing signal of two resistance detecting units of the strain measuring unit of FIG. 4, R4 refers to a state of a sensing signal of two resistance detecting units of the strain measuring unit of FIG. 5, R5 refers to a state of a sensing signal of two resistance detecting units of the strain measuring unit of FIG. 6, and R6 refers to a state of a sensing signal of two resistance detecting units of the strain measuring unit of FIG. 7.

Further, the '+' refers to a state in which strain in the two resistance detecting units is increased, the '−' refers to a state in which strain in the two resistance detecting units is decreased, and the '0' refers to a state in which resistive strain in one of the two resistance detecting units is increased, and resistive strain in the other one of the two resistance detecting units is decreased.

Components of force may be derived from resistance detection signals shown in the aforementioned Table 1 with combinations shown in the following Table 2 by the controller 130.

TABLE 2

| | A | B | C | D |
|---|---|---|---|---|
| Fx | R1 + R2 (First measuring unit) | R5 + R6 (First measuring unit) | R1 + R2 (Second measuring unit) | R5 + R6 (Second measuring unit) |
| Fy | R1 + R2 (Fourth measuring unit) | R5 + R6 (Fourth measuring unit) | R1 + R2 (Third measuring unit) | R5 + R6 (Third measuring unit) |
| Fz | R3 (First measuring unit) + R3 (Fourth measuring unit) | R3 (Second measuring unit) + R3 (Third measuring unit) | R1 (First measuring unit) + R1 (Fourth measuring unit) | R1 (Second measuring unit) + R1 (Third measuring unit) |
| Mx | R1 (Fourth measuring unit) + R3 (Third measuring unit) | R1 (Fourth measuring unit) + R3 (Third measuring unit) | R3 (Fourth measuring unit) + R1 (Third measuring unit) | R3 (Fourth measuring unit) + Third measuring unit) |
| My | R3 (First measuring unit) + R1 (Second measuring unit) | R3 (First measuring unit) + R1 (Second measuring unit) | R1 (First measuring unit) + R5 (Fourth measuring unit) | R1 (First measuring unit) + R3 (Second measuring unit) |
| Mz | R6 (First measuring unit) + R6 (Fourth measuring unit) | R6 (Second measuring unit) + R6 (Third measuring unit) | R5 (First measuring unit) + R5 (Fourth measuring unit) | R5 (Second measuring unit) + R5 (Third measuring unit) |

As shown in Table 2, a component of force, which is sensitive to a predetermined force, may be derived by the controller 130 through A, B, C, and DFMF. Further, the controller 130 may be configured to derive output signals shown in the following Table 3 by performing a calculation of (A+B)−(C+D) for each Fx, Fy, Fz, Mx, My, and Mz.

TABLE 3

| | Fx | Fy | Fz | Mx | My | Mz |
|---|---|---|---|---|---|---|
| Applying Fx | 8 | 0 | 0 | 0 | 0 | 0 |
| Applying Fy | 0 | 8 | 0 | 0 | 0 | 0 |
| Applying Fz | 0 | 0 | 8 | 0 | 0 | 0 |
| Applying Mx | 0 | 2 | 0 | 8 | 0 | 0 |
| Applying My | −2 | 0 | 0 | 0 | 8 | 0 |
| Applying Mz | 0 | 0 | 0 | 0 | 0 | 8 |

As described above, combined signals of any two combined strain gauges may be detected in a switching manner as described above by the configuration of the sixteen strain gauges that constitute the first measuring unit 20, the second measuring unit 30, the third measuring unit 40, and the fourth measuring unit 60 of the present exemplary embodiment, respectively, thereby more accurately deriving a resistance signal sensitive to a predetermined force.

As described above, the present invention has been described with reference to the exemplary embodiment illustrated in the drawings. However, the present invention is not limited to the exemplary embodiments, and numerous exemplary variations or other exemplary embodiments are possible within the equivalent range of the present invention by those skilled in the art to which the present invention pertains.

DESCRIPTION OF SYMBOLS

10: Sensor substrate
20: First measuring unit
30: Second measuring unit
40: Third measuring unit
50: Strain measuring unit
51: First strain gauge
51a: First resistance detecting unit
53: Second strain gauge
53a: Second resistance detecting unit
55: Third strain gauge
55a: Third resistance detecting unit
57: Fourth strain gauge
57a: Fourth resistance detecting unit
110: Signal storing unit
130: Controller

What is claimed is:

1. A switching type six-axis force-torque sensor, comprising:
a sensor substrate attached to a structural body to be measured;
a first measuring unit installed at one side in respect to a substantially central portion of the sensor substrate and configured to measure strain;
a second measuring unit installed on the sensor substrate at a position that faces the first measuring unit in respect to the substantially central portion and configured to measure strain;
a third measuring unit installed at a position orthogonal to a connecting line, which connects the first measuring unit and the second measuring unit, and configured to measure strain; and
a fourth measuring unit installed at a position that faces the third measuring unit in respect to the substantially central portion and configured to measure strain,
wherein the first measuring unit, the second measuring unit, the third measuring unit, and the fourth measuring unit are radially disposed in respect to the substantially central portion, and a strain measuring unit that includes a plurality of piezoresistive pattern portions is provided, wherein the strain measuring unit includes:

a first strain gauge installed on the sensor substrate, and connected with a first resistance detecting unit;

a second strain gauge connected with the first strain gauge in a linear alignment in a same direction via a first signal line on the sensor substrate, and connected with a second resistance detecting unit;

a third strain gauge connected to the first signal line via a branch line on the sensor substrate, and connected with a third resistance detecting unit;

a fourth strain gauge connected with the third strain gauge in a linear alignment in a same direction via a second signal line, and connected with a fourth resistance detecting unit;

the pair of the first and second strain gauges are aligned in parallel with the pair of the third and fourth strain gauges, respectively; and the first signal line and the second signal line are connected via the branch line.

2. The switching type six-axis force-torque sensor of claim 1, wherein the sensor substrate is a silicon wafer.

3. The switching type six-axis force-torque sensor of claim 1, wherein the piezoresistive pattern portions include strain gauges.

4. The switching type six-axis force-torque sensor of claim 1, wherein in the strain measuring unit, two strain gauges selected from the first strain gauge, the second strain gauge, the third strain gauge, and the fourth strain gauge are configured to sense a resistance signal using two detecting units selected from the first resistance detecting unit, the second resistance detecting unit, the third resistance detecting unit, and the fourth resistance detecting unit.

5. A switching type six-axis force-torque measuring apparatus, comprising:

a switching type six-axis force-torque sensor according to any one of claim 1, 2, 3 or 4 a signal storing unit configured to store a sensing signal transmitted from the switching type six-axis force-torque sensor; and a controller configured to receive a sensing signal from the signal storing unit, and combine signals from any two strain gauges that are selected from strain gauges that constitute the first measuring unit, the second measuring unit, the third measuring unit, and the fourth measuring unit, wherein the strain gauges include sixteen strain gauges, wherein four strain gauges are installed in each of the first measuring unit, the second measuring unit, the third measuring unit and the fourth measuring unit.

* * * * *